United States Patent [19]

Ahm

[11] Patent Number: 5,201,141
[45] Date of Patent: Apr. 13, 1993

[54] METHOD OF HYDROPONICAL GROWING OF PLANTS AND AN APPARATUS AND A SYSTEM FOR USE BY THE METHOD

[75] Inventor: Poul H. Ahm, Gran Canaria, Spain

[73] Assignee: Bentle Products AG, Zug, Switzerland

[21] Appl. No.: 557,397

[22] Filed: Jul. 23, 1990

Related U.S. Application Data

[63] Continuation-in-part of Ser. No. 418,771, Sep. 22, 1989, abandoned, which is a continuation of Ser. No. 25,883, Mar. 16, 1987, abandoned, which is a continuation-in-part of Ser. No. 725,161, Apr. 22, 1985, abandoned, which is a continuation of Ser. No. 449,211, Dec. 13, 1982, abandoned.

[30] Foreign Application Priority Data

Oct. 19, 1979 [DK] Denmark .................... 4420/79

[51] Int. Cl.$^5$ .................................. A01G 31/00
[52] U.S. Cl. ................................ 47/67; 47/59
[58] Field of Search .......................... 47/59–66, 47/14, 67, 68, 73, 77, 79–86

[56] References Cited

U.S. PATENT DOCUMENTS

| | | | |
|---|---|---|---|
| 1,811,574 | 6/1931 | Barrett | 47/66 |
| 3,739,522 | 6/1973 | Greenbaum | 47/34.13 |
| 3,872,625 | 3/1975 | Greenbaum | 47/1.2 |
| 4,118,891 | 10/1978 | Kehl et al. | 47/59 |
| 4,149,339 | 4/1979 | Hall et al. | 47/67 |
| 4,392,327 | 7/1983 | Sanders | 47/59 |
| 4,403,446 | 9/1983 | Wolfe et al. | 47/58 |

FOREIGN PATENT DOCUMENTS

| | | |
|---|---|---|
| 922106 | 3/1973 | Canada ........... 47/64 |
| 3316791 | 5/1983 | Fed. Rep. of Germany. |
| 3512507 | 4/1985 | Fed. Rep. of Germany. |
| 3607772 | 3/1986 | Fed. Rep. of Germany. |
| 2314659 | 5/1975 | France. |

Primary Examiner—David A. Scherbel
Assistant Examiner—Michele A. Van Patten
Attorney, Agent, or Firm—Cooper & Dunham

[57] ABSTRACT

In a method of hydroponical growing of plants, a drip irrigation pipe having outlets disposed along the length thereof is inserted between a pair of flatwise juxtaposed layers of water-impervious material of an apparatus alongside a first closed longitudinal edge thereof. The apparatus including the supply pipe is suspended with said first closed longitudinal edge along a suspension means placed at a substantially horizontal level. Roots of plants are inserted in between said two layers downstreams of said outlets and with the stems extending through throughcuts in one of said two layers. Nutrient solution is fed through said supply pipe and outlets and guided to the roots of each plant and is quickly percolated through said roots and collected below the roots for recirculation or discharge thereof.

The apparatus in form of a growing device is comprised by two flatwise juxtaposed layers of water-impervious material being intersealed along at least one longitudinal edge thereof, said growing device being suspended along said closed longitudinal edge on a suspension means placed at a substantially horizontal level.

A system for the practicing of said method comprises a number of said suspended growing devices, a collecting tank for nutrient solution, a control means for continuously controlling said nutrient solution, pumps and supply pipes for continuously carrying of nutrient solution to the plants and collecting means and at least one gutter for collecting and passing-on of used, excess nutrient solution from the plants to the collecting tank.

20 Claims, 9 Drawing Sheets

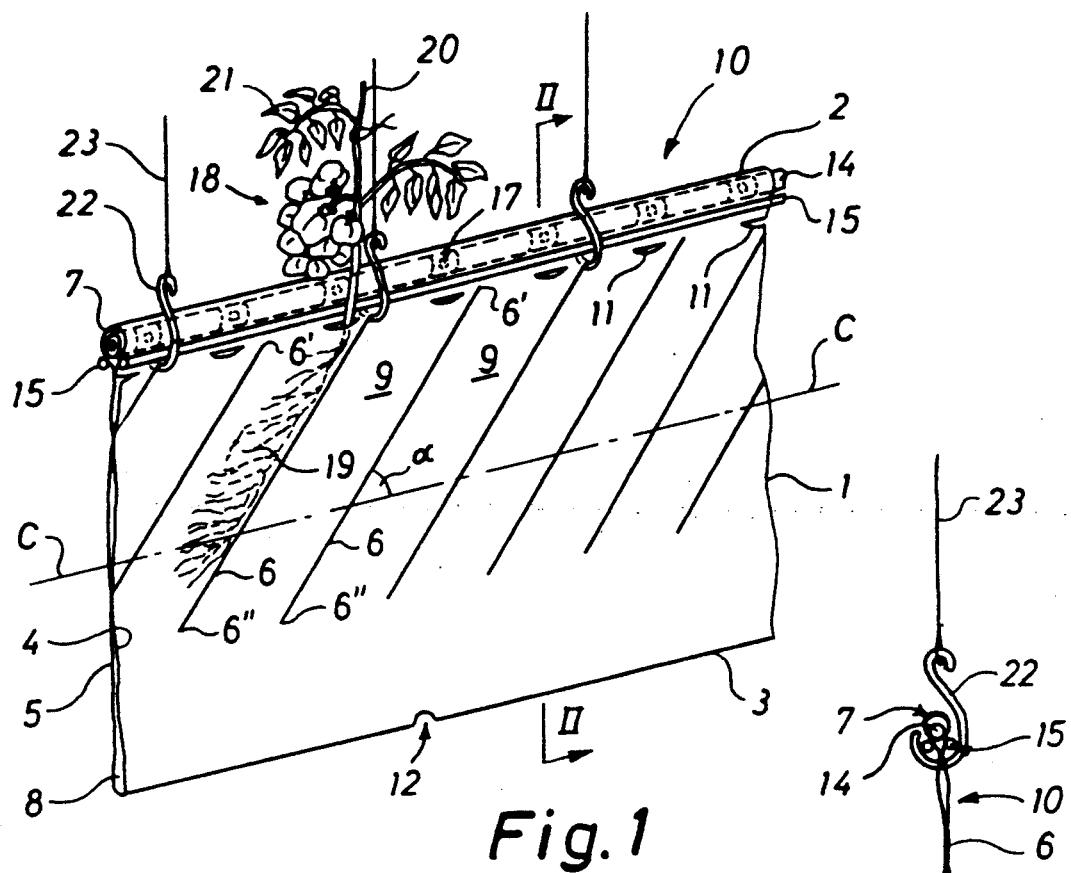
Fig. 1
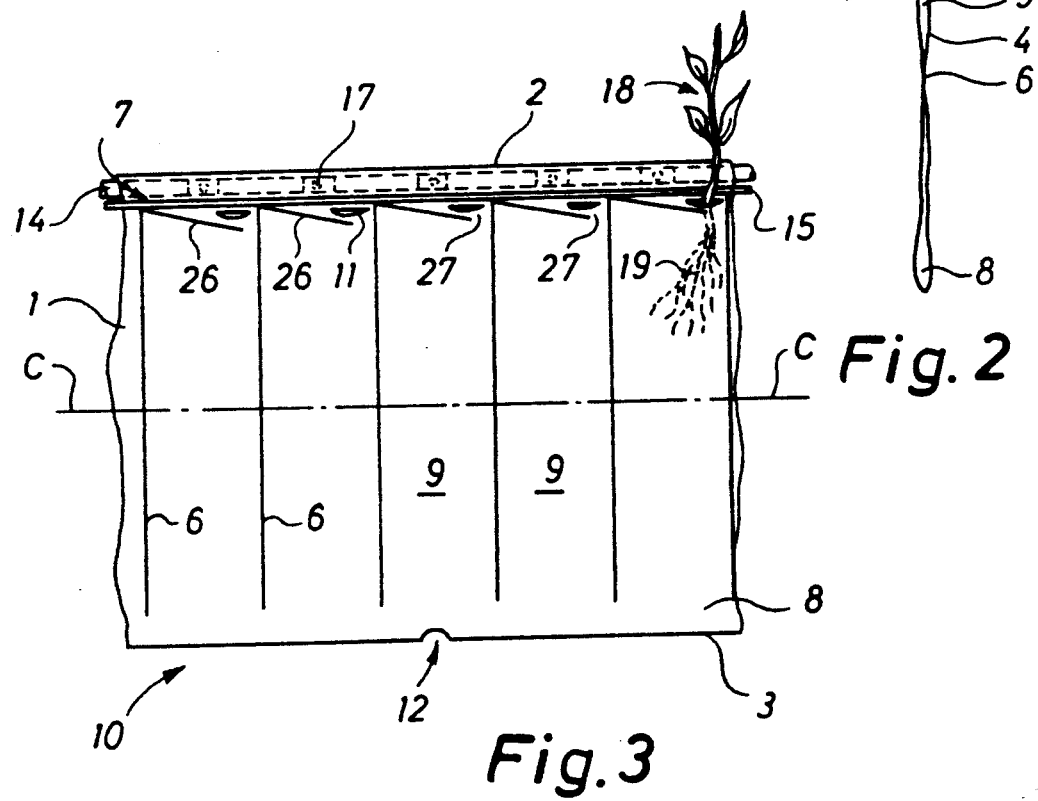
Fig. 2
Fig. 3

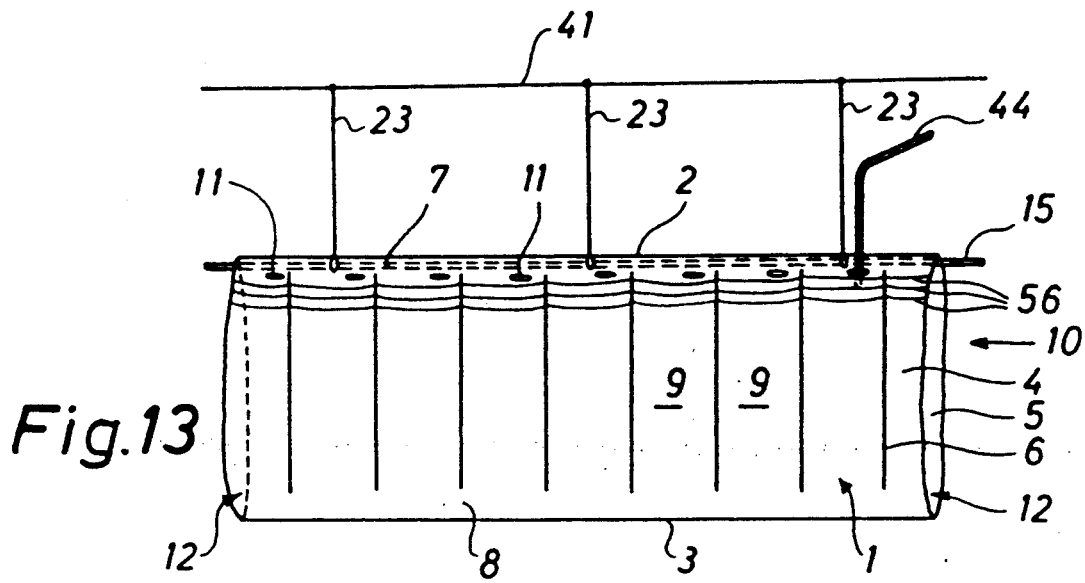
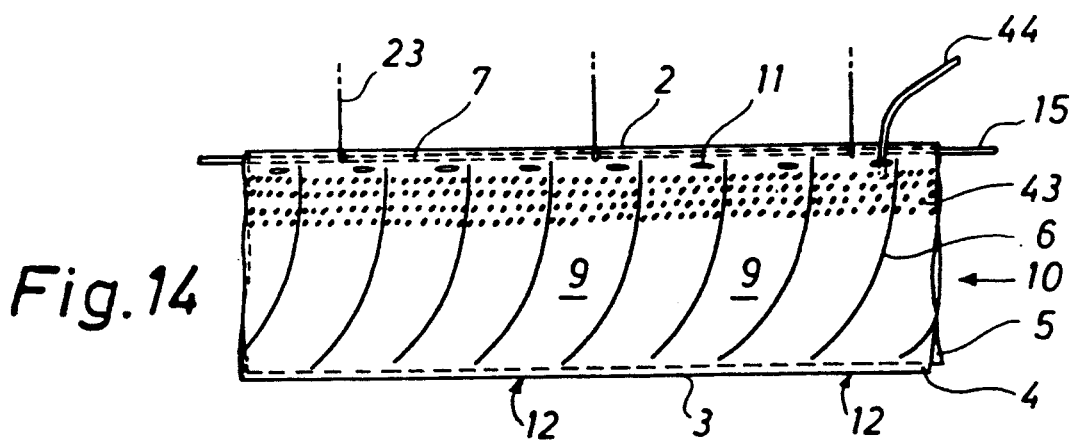
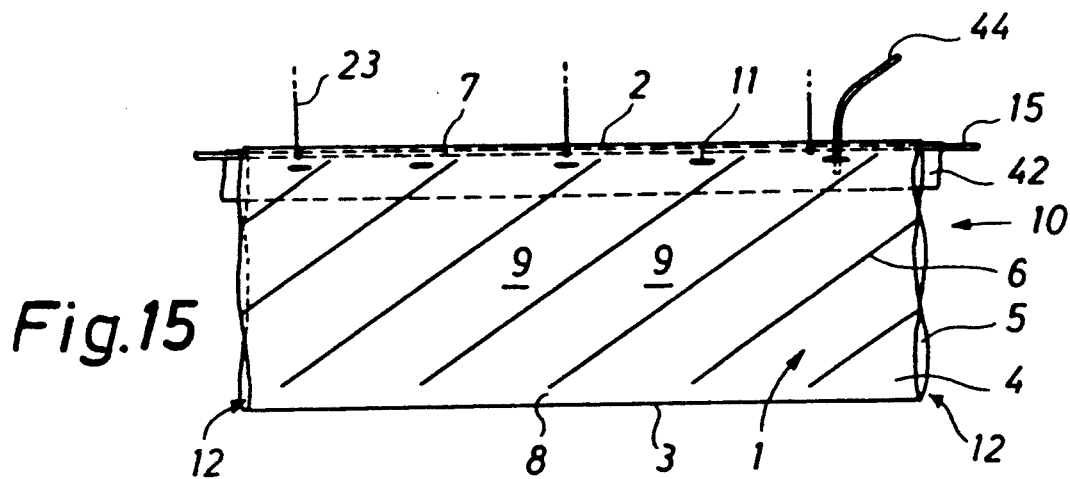

METHOD OF HYDROPONICAL GROWING OF PLANTS AND AN APPARATUS AND A SYSTEM FOR USE BY THE METHOD

This application is a continuation-in-part of application Ser. No. 418,771 filed Sep. 22, 1989, now abandoned, which, in turn is a continuation of application Ser. No. 025,883 filed Mar. 16, 1987, abandoned, which, in turn, is a continuation-in-part of application Ser. No. 725,161 filed Apr. 22, 1985, abandoned, which, in turn, is a continuation of application Ser. No. 449,211 filed Dec. 13, 1982, abandoned.

TECHNICAL FIELD

The present invention relates to a method of growing plants, whereby an apparatus comprised by a plastic film is used for developing the roots, whereas the plant stem extends through a top opening in the apparatus, and whereby the apparatus is continuously supplied with water containing the additives necessary for the growth of the plants, said water being guided towards the area of the inserted plant, excess water leaving the apparatus through one or more openings therein in the opposite end thereof relative to the opening through which the stem extends.

BACKGROUND ART

A method of this type is known from an article in "Supplement to the Grower" from Aug. 24, 1978 with the headline "Peter Bailey's drip system-cheap hydroponics", in which an amendment of the nutrient film technique (NFT) is described, which inter alia is used when cropping cucumbers.

The method described in the above article is based on a system known in Scandinavia using rock wool as growth substrate, and which is characterized by the use of bags in which the base is having a considerable slope. However, the method dealt with in the article does not employ steep slope of the base of the bags, and furthermore it avoids the use of rock wool. Instead a 2.5 cm layer of peat-moss litter is used or a capillary mat of a corresponding thickness, on which the plants in pots are placed for watering either from the top or from the bottom side by means of the capillary mat. The water is supplied through dripping either to the pots or to the mat, and as a consequence of the sloping base for the mat, the surplus water leaks out from the mat and runs through slits in the surrounding plastic sheet and further into a gulley.

Furthermore, an article in Financial Times on the 11th Jun. 1979 discloses a method, whereby growing bags located on a slightly sloping base is used for cropping for instance cucumbers and tomatoes. The bags may be filled with peat moss which is light and clean. This is equally true of pulverised bark which many regard as a more desirable medium since it is available in almost endless amounts, whereas peat moss is a natural soil which is available in a finite supply.

Recently, a dehydrated "board" of compost has been tested which only weighs about 3.5 kg and consequently is very easy to transport. It turned out that when wetted with about 18 l of water the board expands into a growing bag of an appropriate size in such a manner that when using a 1.2 m long bag it is possible to grow four tomato plants in a single growing bag.

An essential problem by using such growing bag is, however, that the growth substrate must posses an essential water retentiveness in order to maintain the growth substrate moistened thoroughly. Furthermore, such a water retentiveness retards the continuous exchange of water, whereby partly an insufficient supply of the nutrients and oxygen necessary for the growth of the plants to all the parts of the root system arises, partly a putrefaction may occur in the parts of the growth substrate wherein the supply of oxygen is insufficient.

DE-OS No.2,723,435 discloses a bag-shaped growing unit containing a granular plant growth substrate comprising plant soil or other growth substrates ready for use and which by addition of water with or without the addition of nutrients are made swelling.

These known growing bags are, however, encumbered with the serious drawback that they do not permit a continuous and automatically controlled supply of water and nutrients to the plant growth in connection with a recirculation of the watering water. The presence of soil and consequently of soil bacteria involves a serious risk of infection of all the plants in case they were watered by means of a common watering system. Moreover, the use of a hydrophilic growth substrate capable of swelling has turned out to imply root putrefaction as a consequence of an insufficient supply of air. Upon the swelling it is not possible to carry out the exchange of water, said exchange ensuring the necessary supply of both oxygen and nutrients. Furthermore, it turned out that the water is bonded so strongly to the hydrophilic growth substrates used in practice that in reality the major portion thereof is not available to the plant growth in such a manner that it may be absorbed by the plant roots.

Various other methods, devices and systems of this kind have been developed through the time, based on functions and constructions leaving the plant roots either immersed in the nutrient solution, such as e.g. disclosed in U.S. Pat. No. 3,739,522, or surrounded by a growth medium from time to time saturated with nutrient solution, e.g. by dipping said medium in the nutrient solution, such as disclosed in U.S. Pat. No. 4,118,891. In either situation, the exchange of nutrient solution around the roots is rather slow. As a result the supply of nutrients and oxygen to the roots as well as the removal of waste products from the roots is inadequate so that the conditions for the growth of the plant is unsatisfactory.

Experiments have shown that one of the decisive factors in the efforts of optimizing the growth of plants is that the conditions for the roots in taking up the water and exchange of the necessary amounts of nutrients and oxygen with waste products is as favourable as possible so as to minimize the stressing of the plants. Further, said experiments have shown that these conditions are favoured by a constant high percentage of relative humidity and oxygen accessible for the roots together with the maintenance of a steady but low concentration of the nutrients necessary in an accessible form and a lowest possible concentration of waste products including waste salts all around the roots. From said experiments it also appears that even very low concentrations of the nutrients could still be adequate as long as the concentrations are still maintained at a level sufficient to secure the desired uptake of the nutrients necessary.

Consequently, a continuous and fast exchange of the nutrient solution all around the roots is of the greatest importance in order to ensure a fast removal of waste products and a steady supply of fresh nutrients of the composition and concentration required at the same time as it provides for a high percentage of oxygen accessible to the roots. The main advantage resulting in carrying out a continuous and fast exchange of nutrient solution all around the roots is the possibility of minimizing the concentrations of nutrient salts and waste salts around the roots, thereby reducing the osmotic pressure outside the roots, which osmotic pressure is counteracting the uptake of water, at the same time as the necessary nutrient salts are still provided.

In U.S. Pat. No. 3,744,183 a method and an apparatus are disclosed in which the plants are suspended in the air by means of sponge-elements holding the root collars, and wherein the nutrient solution is fed intermittently or continuously by means of a vertically extending carrier member being in contact with the roots from two opposite sides thereof and being supplied with nutrient solution from the top of said carrier member. The apparatus is further provided with an outer supporting member and a system for collecting and recycling of the nutrient solution. In said method and apparatus, however, the apparatus used is quite open on top, and consequently a serious drawback is prevailing in that the water will evaporate at the top of the apparatus, especially from the sponge, the carrier member and the roots thereby leaving a nutrient solution with a higher concentration of salts around the roots and finally a depositing of cakes of salts around the top of the roots with the effect of serious damaging the roots and the growth of the plants. Furthermore, said apparatus is comprised by an outer supporting member as well as by an inner carrier member and a means for holding the plants therein, which is a rather complex and expensive apparatus.

The object of the present invention is to disclose an improved and simplified method for hydroponical growing of plants as well as an extremely simple apparatus and a system for practicing of said method.

The inventive method is characterized by comprising:

using an apparatus comprised by a pair of flatwise juxtaposed layers of watertight material, such as plastic film, defining at least one flat interspace for the development of the roots of a plant, said apparatus having a first closed end and an opposite second end and further being without any growth substrate therein, and said interspace being substantially closed to the surrounding atmosphere at least around the top of the root apart from minor openings for the plant stem and for the exchange of nutrient solution, suspending said first closed end of the apparatus on at least one suspension means with the plane of the interspace vertically or slopingly oriented, inserting plant roots inside said interspace at the upper part thereof, with the stem of the plant extending through a minor throughcut in one of said layers, adding of nutrient solution to said interspace at a location above said roots of the plant and guiding it to said roots, quickly percolating said nutrient solution down the roots, and allowing unabsorbed nutrient solution to drain out from below the roots through at least one drain opening at a lower part of said interspace of the apparatus.

By this indicated method a quick exchange and percolation of the nutrient solution is obtained inside an almost completely closed interspace for the root, whereby the control of the root-environments is very easily carried out, and the depositing of salts at any place of the plant roots is avoided, and which is further well suited for the simultaneous growing of several plants under equal and constant conditions, as well as for growing of a single plant.

Preferably, the unabsorbed nutrient solution drained out from below the roots is recollected and recirculated in a per se known manner.

Preferably, this method is characterized by the use of a nutrient solution having a carefully controlled concentration of nutrients well below 2 per thousand, and by feeding nutrient solution in the amount of at least 0.1 l/h for each plant, preferably at least 0.25 l/h for each plant, whereby an extremely rapid growth of the plants is usually obtained.

Said method is also applicable in connection with an apparatus having a further suspension means for suspension of the apparatus with at least a part of the interspace or interspaces slopingly oriented, thereby broadening the range of apparatuses applicable and improving the adaptation of the apparatuses to the plants to be grown.

In using a very simple growing device comprising a flattened tubing suspended on a suspension means the upper part of said growing device is placed sloping proportional to the vertical plane containing the suspension means by means of a longitudinal displacement means. Thereby, in an initial phase of the growth, a good contact between the roots and the nutrient solution is ensured. In order to establish said sloping a displacement means, i.e. a wire, could be suspended below and sidewise displaced of the suspension means for the growing device, thereby supporting the upper part of the growing device in a sloping way.

The collection of percolated nutrient solution is simplified by using a flattened plastic tubing being closed alongside the bottom edge as well as alongside the top edge except for a discharge opening at the lowest point of the bottom edge.

In using a growing device having said pair of flatwise juxtaposed layers sealed together in intermediate lines or zones spaced in the longitudinal direction of the said layers and forming a series of transverse passageways between said zones for the passage of nutrient solution and development of the roots, a good contact between the roots and the nutrient solution is obtainable, even with a freely hanging growing device.

In a specially preferred embodiment of the method of the invention, an apparatus formed as a flattened plastic tubing is used as a growing device for a number of plants, said tubing being suspended along each of the two opposite closed longitudinal edges thereof on substantially parallel, horizontal extended suspension means, the intermediate part of the growing device sagging therebetween, thereby forming interspaces each sloping from a closed edge towards the middle of the device, plant roots being inserted into interspaces on either side of the middle and nutrient solution being added close to each suspended edge and percolated towards the middle of the tubing, and excess nutrient solution drained out through a drain opening at the lowest point of the center of the tubing, whereby a very favourable method of growing minor plants, such as lettuce, strawberries, beans, and a number of cut flowers, is obtained in which the plants could be placed all over the top surface of the growing device.

The inventive apparatus is comprising:

a pair of flatwise juxtaposed layers of watertight material, such as plastic film, defining at least one flat interspace for the development of the roots of a plant, said interspace being substantially closed to the surrounding atmosphere, at least at the top of the roots, apart from minor openings for the insertion of the plant roots and the plant stem and for the addition and drainage of nutrient solution, said apparatus having a first closed end and a second opposite end, said apparatus further having means for guiding the added nutrient solution to the area of the inserted roots, said means for guiding not including a growth substrate, and means for suspending the apparatus such that the nutrient solution added is allowed to quickly percolate the roots and drain out through the drain opening.

It is to be stressed that no growing substate at all is to be inserted between the two layers, and that, consequently, a very cheap apparatus is obtained, especially a growing device for simultaneous growing of a number of plants.

One preferred inventive apparatus intended for the growing of a single plant is having the form of a flattened growing bag defining a single interspace being closed all around its circumference apart from a minor opening at its first end for the insertion of a plant and the addition of nutrient solution, and at least one drain opening at its opposite second end, said growing bag having incorporated therein, as a means for guiding the nutrient solution, a thin coherent porous layer of water-distributing material selected from the group consisting of paper, glass wool, rock wool, foamed plastic, woven fiber-containing textile material, and non-woven fiber-containing textile material; and said growing bag further having means for suspending the growing bag such that the nutrient solution added to the interspace of the growing bag through the opening at the first end passes over the said water-distributing material and the plant roots and drains out through the drain opening at the second end.

In this connection said thin coherent porous layer of water-distributing material is sized to fit the area of the interspace defined in said bag, thereby imparting a very secure passing on of the nutrient solution to the roots.

For many purposes, however, it has shown satisfactory when said thin coherent porous layer of water-distributing material is filling out only a minor part of the bag close to and alongside the first end of the bag around the opening for the plant stem and for the addition of nutrient solution, as the roots themselves gradually will take over the guiding of the nutrient solution inside the bag.

Advantageously, said suspension means includes an aperture in the two plastic layers at said first end of the growing bag, whereby said growing bag is very easily suspended by a string.

A preferred embodiment of the apparatus of the invention intended for growing of several plants is comprising:

a windable length of a pair of flatwise juxtaposed layers of watertight material, each of said two layers having first and second longitudinal edges, the two layers being interconnected and sealed at least along said first longitudinal edges thereof and being adapted for suspension on a substantially horizontally extending suspension means alongside said first interconnected and sealed edges, thereby forming a growing device closed at top, at least one of said two layers having minor throughcuts spaced along the length thereof and close to said first edge, for the insertion of plant roots, said growing device being very easy to produce in endless form by extrusion.

A further preferred embodiment of the growing device of the invention is comprising:

a windable length of a flattened tubing of plastic film having opposed first and second closed longitudinal edges, said tubing being adapted for suspension on a suspension means alongside said first closed longitudinal edge thereof, said tubing further being adapted for the insertion of a drip irrigation pipe inside said tubing alongside said first closed edge, said plastic tubing further being adapted for the insertion of plantroots through minor spaced throughcuts through at least one of the two juxtaposed layers of said tubing, close to said first closed longitudinal edge, and said plastic tubing being provided with a discharge opening for percolated nutrient solution at the lowest point of said second closed longitudinal edge, said growing device especially being advantageous, as it is very inexpensive to manufacture, and which is especially advantageous for use in a slopingly suspended position in which a good contact between the roots and the nutrient solution is still ensured. Further, this embodiment is advantageous because of the further longitudinal passageway at the second closed edge for collecting and passing on of excess nutrient solution to the discharge opening.

A further advantageous embodiment of the inventive growing device is characterized in that said two layers of plastic are sealed in sealing-zones having a simple geometric form and spaced along the longitudinal direction of said layers and from the longitudinal edges thereof, said sealing zones thereby leaving longitudinally free passageways alongside said first and second edges and forming a series of successive transverse passageways open to said two longitudinally extending passageways, said transverse passageways having a substantially flat cross-section.

The resulting device is usable for simultaneously growing several plants and is advantageous in that a series of transverse passageways, each for the growth of one plant and for the percolation of nutrient solution therethrough is provided, thereby preventing some plants from predominating over neighbouring plants and minimizing the risk of spreading of disease between the roots.

The said growing device is intended for use without any growth substrate therein and in a vertically suspended position with the transverse passageways extending in a vertical plane. As a result a fast percolation of fresh nutrient solution through each transverse passageway is obtained, thus attaining optimum and uniform conditions for the growth of each plant.

The said device is of simple construction and inexpensively manufactured, as it is preferably made by simply welding together of a continuously blown plastic tube along the sealing zones followed by separating the tube into tubings of a length suitable for the purpose of the topic. Furthermore, the device is easy to instal and to use, thereby minimizing the total cost of growth of the plants. The said device may also be made of one or more lengths of plastic film put together in a flatwise juxtaposed position or of other bendable materials impervious to water, such as water-proof paper or other waterproof fibrous fabrics. The interconnections and sealings may be carried out in any known way. The material used is preferably of a type impenetrable to light. More preferably the material is of a light-reflecting type thereby minimizing the amount of heat collected in the growing device. In an advantageous embodiment of the growing device according to the invention the tubing may also comprise a heat-insulating material, such as a foamed or otherwise formed cellular film material, thereby reducing the heat transfer through the tubing and obtaining an economic use of heated nutrient solution.

A further preferred embodiment of the growing device of the invention is characterized by a windable, flattened plastic tubing having two flatwise juxtaposed layers of plastic film, said layers being interconnected along opposing first and second closed longitudinal edges, respectively, of said flattened plastic tubing, said two flatwise juxtaposed layers of the flattened tubing being sealed along two parallel longitudinal rows of sealing-zones located on either side of the center line of said flattened tubing, each sealing-zone in a row extending between a first point located some distance away from a closed edge of the flattened tubing, and a second point located further away from said closed edge and some distance away from the center line of the flattened tubing and on the same side thereof as said first point, said rows of sealing-zones thereby leaving free longitudinal passageways each extending along the length of a respective one of said closed edges and a free longitudinal, central passageway extending between said two parallel rows of sealing-zones, said two rows of sealing-zones further forming two series of successive, transverse, flat passageways separated from each other by the sealing-zones, and each open to a corresponding longitudinal, outer passageway and to the longitudinal, central passageway.

This embodiment is particularly suitable for outdoor growing of plants, as it is very easily mounted in a stable position, so that the growing device can resist wind action. Depending on preselected arrangements, this embodiment moreover allows rainwater either to be collected and integrated in the growing system or to be discarded when needed. Depending on the culture grown, it is furthermore possible to grow an increased number of plants per unit length of the growing device without requiring a corresponding larger area of access to the plants by simply placing more plants along the length of each transverse passageway.

The sealing zones dividing up the growing device in transverse passageways have a simple geometric form, such as dots, rings or straight or curved lines extending perpendicular to, inclined to or parallel with the longitudinal direction of the length or tubing.

An embodiment of the growing device having two parallel rows of sealing zones, which is of particular interest from a manufacturing point of view is characterized in that the sealing zones of the two rows are formed as lines inclined to the longitudinal direction of the tubing in a substantially symmetrical way with respect to the center line. Thus the two sides of the growing device display the same properties during production as well as in use of the system.

In one embodiment of the inventive device having transverse sealing lines the transverse sealing lines are straight lines inclined at an acute angle of between 0° and 90°, preferably between 0° and 45°, most preferably about 10°, to the longitudinal direction of the device, thereby maintaining a relatively quick percolation of the nutrient solution through the transverse passageways, when the device is suspended with the transverse passageways oriented in a substantially vertical plane. In order to maximise the growing place left above the device within a predetermined level, e.g. inside the roof of a greenhouse, the angle should be as small as possible, whereby the height of the device between the upper and the lower, longitudinal edges thereof is as low as possible for a given length of the transverse passageways.

Depending on the type of plants grown, different proportions between the length and the width of the transverse passageways are recommended. For most purposes, however, it is satisfactory that the dimension of the transverse passageway from one longitudinal passageway to the other is about 3-5 times the dimension of the transverse passageway in the longitudinal direction of the device.

The choice of width of the longitudinal passageways between the closed edges of the tubing and the row of sealing zones depends on the manner of supplying the nutrient solution, for instance on the dimension of the supply pipes to be used, and on the space necessary for the roots and for the collection and outlet of the percolated water. For most purposes, however, it is satisfactory that the sealing zones extend between a distance of about 20-80 mm away from a first closed edge of the layers of the collapsed tubing. On the other hand, a considerably greater distance from the second edge or the center line of the layers or tubing may also be desirable, for instance 80-300 mm.

While the above simple form of the growing device functions quite satisfactory in most cases, it is occasionally advantageous to provide the growing device with additional longitudinal sealings along longitudinally extending sealing lines, each additional sealing extending from the end of a first sealing zone at the first point towards a neighbouring sealing zone to a point close to said neighbouring sealing zone and to the adjacent longitudinal passageway, said additional sealings thereby being gently inclined to the inside of the adjacent transverse passageways and leaving a passage from the adjacent longitudinal passageway to each of said transverse passageways for the inlet of nutrient solution therein.

This applies especially for devices having very wide transverse passageways separated by sealing zones extending perpendicular to the longitudinal direction of the device. The above arrangement ensures a correct delivery of the supplied nutrient solution to the area of the inserted roots. Any nutrient solution supplied by a supply pipe in the area of a transverse passageway between two adjacent sealing zones is transferred to said transverse passageway through the passage left by the additional, gently inclined, sealing line. Consequently, it is easier to place the plant in such a way that the supply of nutrient solution arrives at the area of the inserted roots.

It is worth underlining that the growing device is used completely without any kind of growing substrate inside the device, thereby eliminating all costs and other disadvantages therefrom. Moreover, storing and shipping costs are thus kept at a minimum. In addition all of the growing device as well as the plant material is burnable after use upon a short air-drying period.

According to a further feature of the invention the growing device is initially provided with a minor throughcut through at least one of the layers of the growing device at the end of each transverse passageway close to the longitudinal passageway at the first edge or to the longitudinal outer passageways, respectively, for insertion of a plant and, according to another feature, with at least one opening to the outside from the longitudinal passageway at the second closed edge of the device or the longitudinal central passageway, respectively, for the outlet of excess nutrient solution, thus expediting the correct mounting of the growing device. The throughcuts and openings can be provided prior to or during the mounting of the growing device.

A further object of the invention is to provide an improved system for hydroponical growing of plants, where a high degree of functional security is achieved, simultaneous with the cost of initial expenditure as well as the operating costs being kept at a very low level.

The inventive system is of the kind comprising
a collecting tank for a nutrient solution,
a control means for continuously measuring and adjusting the content of nutrient salts and other additives necessary for the growth of plants by adding the necessary amounts of water, macrosubstances, and microsubstances to the nutrient solution,
pumps and pipes for continuously carrying nutrient solution to the plants, and
at least one gutter for collecting and passing-on of used, excess nutrient solution from the plants to the collecting tank, said system further comprising
a number of apparatuses as claimed in claim 7,
a corresponding number of supply pipes, and
suspension means for suspension of the apparatuses,
said apparatuses being adapted for the insertion therein of a supply pipe or the outlets thereof in the interspace close to said suspension means.

The entire system is very simple in its construction. At the same time the mounting of the system and the insertion of the plants are performed in a very simple manner, thus saving a lot of time compared with other systems.

In an advantageous embodiment of the inventive system using a growing device as claimed in claim 13,
a supply pipe in the form of a drip irrigation pipe having spaced outlets is inserted in the longitudinal passageway of each growing device at the first closed longitudinal edge thereof,
said first edge of the growing device and said drip irrigation pipe being suspended on at least one suspension member, such as a cord or wire, stretched between at least two posts, the remaining part of the growing device depending therefrom,
the suspension means further including gripping means gripping around the suspension member and the upper part of the growing device holding the drip irrigation pipe at suitable places along the length thereof, thereby fastening the growing device to the suspension member,
said suspension member being positioned at a level sufficient for keeping the bottom of the growing device just above the top of the gutter.

As a result a very simplified and reliable system is obtained, in which the growing device is kept at a correct position by the suspension member without subjecting the supply pipe to stresses. Moreover, the growing device with supply pipe is easily mounted at or removed from the suspension member.

In a further advantageous embodiment of the said system
the suspension means comprises two parallel wires, tightly stretched between two posts and kept close to each other on either side of the growing device beneath the supply pipe inserted therein, and
the suspension means further comprises gripping means, such as hooks, inserted under the wires and the supply pipe and suspended by strings fastened to a mounting means above the growing device,
thereby supporting the growing device and the plants inserted therein,
the top of said plant being fastened to the string.

The use of this construction enables the positioning of the growing device between the two wires with the first longitudinal passageway including the supply pipe situated just above the wires. This results in a very stable suspension of the growing device. The growing device could of course also be suspended on a single wire positioned inside the upper longitudinal passageway alongside the supply pipe therein.

Despite the suspension wire or wires being tightly stretched, the wires are slightly bowed in a downward direction when loaded with the growing device. Consequently, the lower, second longitudinal passageway is sloping downwards from both ends of the growing device towards the middle thereof, the latter being at the lowermost position. Naturally it is advantageous to place this point above the gutter and to provide the outlet from the second longitudinal passageway at this point.

When using the inventive system for growing plants subjected to wind, said system is advantageously characterized by a further supporting means supporting each growing device against being forcibly removed from the substantially vertically suspended hanging position. In this connection one embodiment of said further supporting means comprises at least one suspension member stretched between abovementioned posts at a level above the lower longitudinal passageway, and a number of locking elements, such as hooks, clamps, straps or pins, securing the growing device to the supporting means.

Further in connection therewith anchoring means holding the growing device, such as strings, nets or tapes, may be fastened at anchoring blocks or suspension members secured below the growing device.

In a system comprising growing devices having two rows of sealing zones the suspension means advantageously comprises at least one suspension member or weighting member pressing or weighing down the central part of the growing device so that it can resist wind action. Said weighting member may advantageously be at least one sandhose placed loosely on the central part of said growing device, or it may be comprised by a supply pipe placed outside of the growing device and having small irrigation pipes extending therefrom, each irrigation pipe having an outlet placed inside the interspace of the growing device, above the roots of an individual plant therein.

In a particularly advantageous embodiment a system including a growing device with two rows of sealing zones comprises an outer plastic tubing surrounding said growing device and carried by an intermediate carrying means, said outer plastic tubing being closed at each end of the growing device thereby substantially forming a miniature greenhouse around said growing device.

BRIEF DESCRIPTION OF THE DRAWING

The invention is described in greater detail below by means of examples of embodiments and with reference to the accompanying drawings, in which FIG. 1 is a diagrammatic, perspective side view of a central section of a preferred embodiment of the inventive apparatus intended for growing of several plants, FIG. 2 is a sectional view along the line II—II of FIG. 1, FIG. 3 is a diagrammatic side view of a section of another embodiment of the inventive aparatus intended for growing of several plants, FIG. 13 is a front elevation of a further simplified embodiment of the apparatus of the invention, intended for growing of several plants, FIG. 14 is a front elevation of yet another embodiment of the apparatus of the invention, intended for growing of several plants, FIG. 15 is a front elevation of still another embodiment of the apparatus of the invention, intended for growing of several plants.

FIGS. 1-15 show various embodiments of the inventive growing device 10 for growing of several plants and a system therefor.

FIGS. 1 and 2 illustrate a preferred embodiment of the inventive growing device 10. In FIG. 1 only a cutout central section of the growing device is shown. Said growing device 10 comprises a collapsed plastic tubing 1 having a first upper, closed longitudinal edge 2 and a second lower, closed longitudinal edge 3 opposing each other. The opposing two layers 4, 5 of the collapsed tubing 1 are sealed together along parallel transverse sealing lines 6 extending transversely to the tubing 1 and inclined at an acute angle a to the longitudinal direction C—C of the tubing 1. Each transverse sealing line 6 extends between two points some distance away from each of the closed longitudinal edges 2, 3, respectively, thereby forming two opposing, longitudinal free passageways 7, 8 parrallel to the closed longitudinal edges 2, 3. Between the longitudinal passageways 7, 8, the tubing 1 is divided up into a number of parallel, flat interspaces forming transverse passageways 9 separated from each other by the transverse sealing lines 6, but open at both ends to the two longitudinal passageways 7, 8 of the growing device 10.

Figure 4:
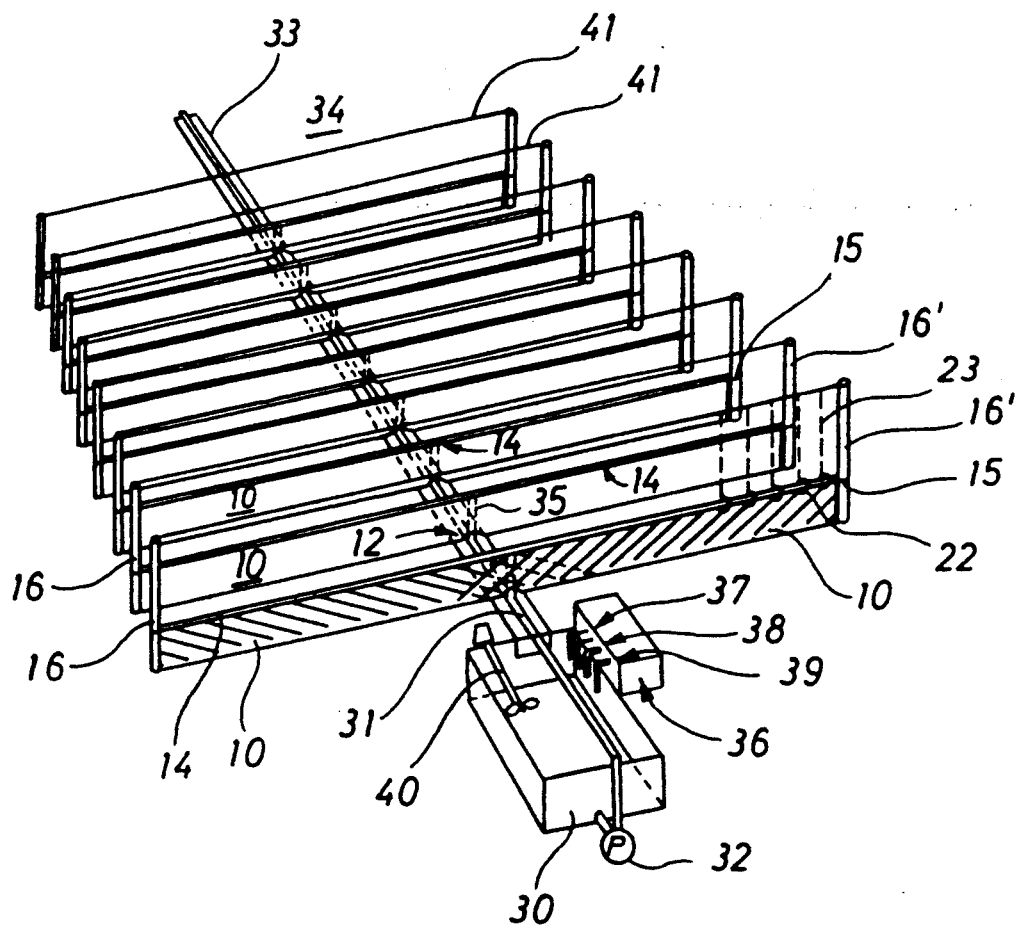
FIG. 4 is a diagrammatic perspective view of an embodiment of the inventive system including the inventive apparatus intended for growing of several plants.

The two opposing layers 4, 5 of the plastic tubing 1 are flatwise juxtaposed. At first the transverse passageways 9 and the longitudinal passageways 7, 8 are completely empty so that the growing device can assume the form of a coiled-up, endless tube (not shown). Optionally, the tube may be perforated in lines (not shown) transverse to the longitudinal direction C—C of the tube to facilitate the separation into suitable lengths of tubing 1, each length forming an individual growing device 10. At the top of each transverse passageway 9 a minor throughcut 11 is made in the layer 4 of the growing device 10, said throughcut enabling the insertion of the roots of a plant into the transverse passageway 9. At the middle of the lower, longitudinal edge 3 an opening 12 is provided acting as an outlet for excess nutrient solution from the growing device 10.

Prior to using the growing device a supply pipe 14 for nutrient solution is inserted into the upper longitudinal passageway 7. The growing device is then mounted on suspension means 15 in form of two parallel wires 15 stretched horizontally between two posts 16, 16', cf. FIG. 4. The two wires 15 are positioned on either side of the growing device 10 and just below the upper longitudinal passageway 7 with the inserted supply pipe 14, and kept close to each other. Thus the upper part of the tubing 1 with the supply pipe is nested on the two wires 15 and the rest of the growing device 10 is suspended therefrom.

Different kinds of supply pipes 14 are usable, provided that they can transfer a continuous flow of nutrient solution into each transverse passageway 9, for instance by drip irrigation. In the preferred embodiment a supply pipe 14 of the type comprising a polyethylene pipe with inserted fittings having outlets 17 opposite each transverse passageway 9 is used.

Upon suspension of the growing device 10 nutrient solution is supplied via the supply pipe 14 with outlets 17 and transferred in a continuous flow to each transverse passageway 9. A plant 18 is inserted through the throughcut 11 with the roots 19 of the plant positioned inside the transverse passageway 9 and the stem 20 and top 21 of the plant extending through said throughcut 11 outside of the growing device 10. The nutrient solution quickly percolates through the roots 19 and is partially absorbed by said roots. The remaining excess nutrient solution percolates down through the transverse passageway 9 and drains out at the bottom of the transverse passageway for being collected inside the lower longitudinal passageway 8 of the growing device 10. As the wires 15 loaded with the growing device 10 are mainly suspended at their ends, the wires 15 and thus the growing device 10 are curved downwardly. Upon collection in the longitudinal passageway 8 the excess nutrient solution flows towards the opening 12 acting as an outlet at the middle of said passageway. For preventing the wires 15 from separating from each other resulting in the growing device 10 sliding down between them, gripping means, such as hooks 22, are inserted under the wires 15, surrounding said wires and holding them together below the upper longitudinal passageway 7 holding the supply pipe 14.

In order to obtain support for the top 21 of a plant 18, the hooks 22 are suspended in strings 23 mounted in mounting means 41, cf. FIG. 4. The top 21 of the plant 18 is fastened to said strings 23 in a manner known per se. When employing the hooks 22 one of the wires 15 can be omitted. It is further possible to exclusively use the hooks 22 and the strings 23 for the suspension of the growing device. This is of special relevance in case of a rigid supply pipe 14. Under such circumstances both wires 15 can be omitted.

FIG. 3 illustrates another embodiment of the inventive growing device 10, where the transverse sealing lines 6 extend substantially perpendicular to the longitudinal direction C—C of the growing device 10. In this embodiment an additional sealing is formed at the top of each transverse passageway, substantially along extending sealing lines 26, in order to provide an inlet for the nutrient solution close to the throughcut 11. The additional sealing 26 extends from the end of one transverse sealing line 6 at the upper longitudinal passageway 7 to a point some distance away from the neighbouring transverse sealing line 6 and slopes away from said longitudinal passageway 7. This results in a passage 27 from the longitudinal passageway 7 to a transverse passageway 9, said passage allowing the flow of nutrient solution from the longitudinal passageway 7 to the transverse passageway 9. The throughcut 11 is placed above the passage 27 so that the roots 19 of an inserted plant 18 are positioned in the area of the passage 27.

Apart from the differently oriented, transverse sealing lines 6 and the additional longitudinal sealings 26 the rest of the growing device 10 is as described above in connection with FIGS. 1 and 2. Optionally, the additional sealings 26 may, of course, also be introduced in the embodiment of FIGS. 1 and 2, although they are normally not necessary in connection with a growing device having transverse sealing lines inclined in an acute angle α of below 30° to the longitudinal direction of the device.

FIG. 4 illustrates an embodiment of the inventive improved system for hydroponical growing of plants using the inventive growing device 10. The system includes a plurality of parallel rows of growing devices 10 each mounted on wires 15 supported by posts 16, 16' and with supply pipes 14 inserted in each growing device. Additional suspension means are provided in form of hooks 22 inserted through the growing device 10 beneath the wires 15 and the supply pipe 14, said hooks being suspended in strings 23 mounted in a mounting means 41. By means of a pump 32 the nutrient solution is carried from a collecting tank 30 and via a pressure pipe 31 to the individual growing devices 10. The pressure pipe 31 is preferably led through a gutter 33 leading to the collecting tank 30 and extending transverse to the growing devices 10 and midways between the posts 16, 16' in the ground 34.

Nutrient solution is carried to the supply pipe 14 in the growing device 10 through a vertical distribution pipe 35 opposite the growing device and optionally extending through a transverse passageway 9 of the growing device. Especially in case of inclined transverse sealing lines 6, the growing device 10 can be divided into two halves, each mounted on a supply pipe 14 on either side of the gutter 33 between the posts 16, 16' and the distribution pipe preferably in a laterally reversed manner.

At the bottom of each growing device an outlet 12 is formed above the gutter 33. The collecting tank 30 is provided with a control means 36 including a known measuring and dispensing assembly 37, 38, 39. At 37 the measuring assembly measures the content of nutrients and other additives necessary for the growth of plants in the nutrient solution contained in the collecting tank 30. Furthermore, it controls the addition of water at 38 and the addition of necessary additives to said solution at 39 in order to obtain a solution with a desired concentration of nutrients. Furthermore, the collecting tank 30 is provided with a propeller 40.

For using the system the growing devices 10 are mounted on supply pipes 14 and wires 15. An appropriate nutrient solution is prepared and circulated in the system by means of the pump 32 via pressure pipe 31, distribution pipes 35 and supply pipes 14. From the supply pipes 14 the nutrient solution percolates through each transverse passageway 9 of the growing devices 10 and flows out through outlets 12 into the gutter 33 and is returned to the collecting tank 30 for recirculation.

Now the roots 19 of the plants 18 are inserted into the transverse passageways 9. The circulating nutrient solution percolates over the roots of the plants, said roots absorbing some of the water and the additives. The excess nutrient solution is returned to the collecting tank 30 together with waste products having been excreted from the roots of the plants.

In the collecting tank 30 the nutrient solution is continuously monitored and adjusted by the control means 36. Optionally, the collecting tank 30 may be provided with an additional rinsing means (not shown) for removing some of the waste products from the plants 18. A predetermined amount of the return solution is to be discarded, either at intervals or continuously, in order to keep the content of waste products separated from the roots below a predetermined standard.

Figure 5:
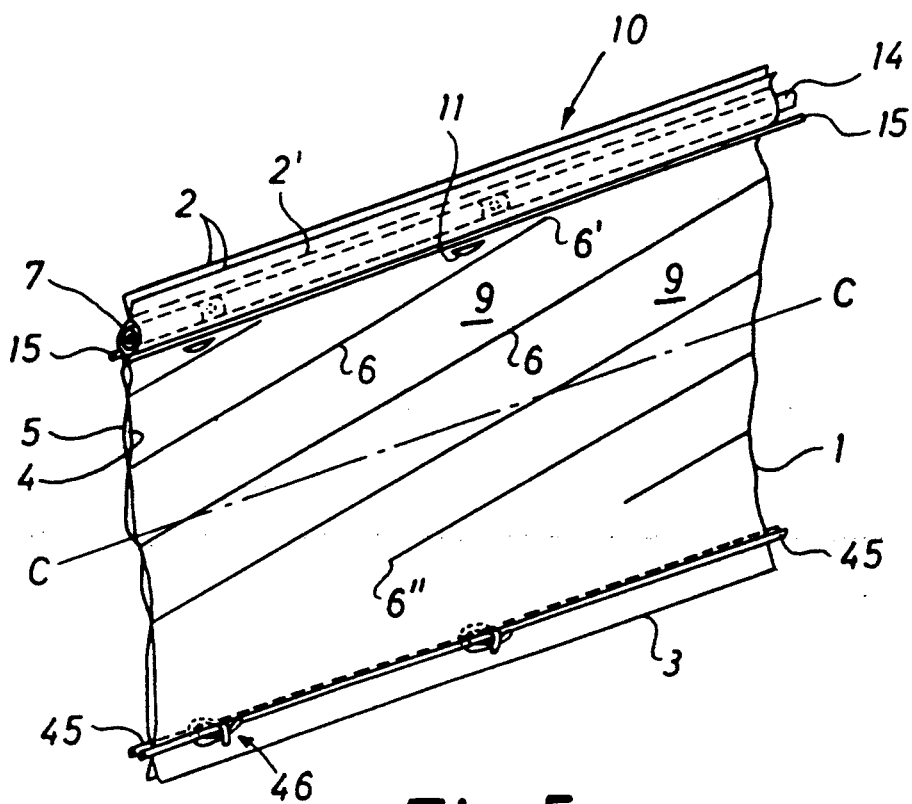
FIG. 5 is a diagrammatic perspective side view of a further embodiment of the inventive apparatus intended for growing of several plants, and having further suspension means supporting the lower part of the apparatus.

FIG. 5 illustrates a further embodiment of the growing device 10 of the invention. Said growing device 10 includes a length 1 of two separate layers 4, 5 of sheet material flatwise juxtaposed each other, said layers 4, 5 being sealed together along transverse sealing lines 6 as described in connection with FIG. 1. The two layers 4, 5 are interconnected along a connection line 2' at the upper edges 2 of said layers, for instance by welding, seaming or by means of locking elements spaced apart in the longitudinal direction C—C of the device. As in FIG. 1, a supply pipe 14 is inserted in the upper longitudinal passageway 7 between the connection line 2' and the transverse sealing lines 6. At the lower part of the device 10 a pair of suspension wires 45 is positioned on either side of the device, stretched between the two posts 16, 16', cf. FIG. 4, and kept close to each other by means of clamps 46 inserted through the two layers, 4, 5 and surrounding and interlocking the two suspension wires 45. The lower edges 3 of the two layers 4, 5 are left unconnected, thereby leaving a longitudinal opening extending at the bottom of growing device 10 so that excess nutrient solution is let out into the soil or in a gutter (not shown).

Figure 6:
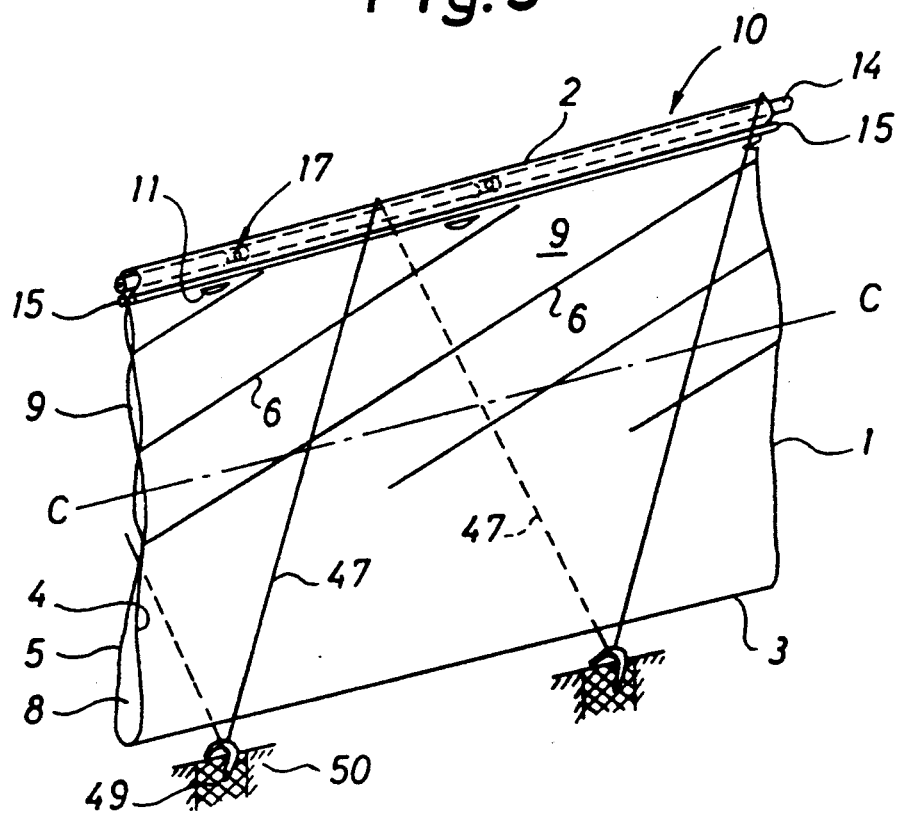
FIG. 6 is a similar diagrammatic perspective side view of the preferred embodiment of the inventive apparatus intended for growing of several plants, and supported by a helically wound anchoring string fastened at anchoring blocks.
Figure 7:
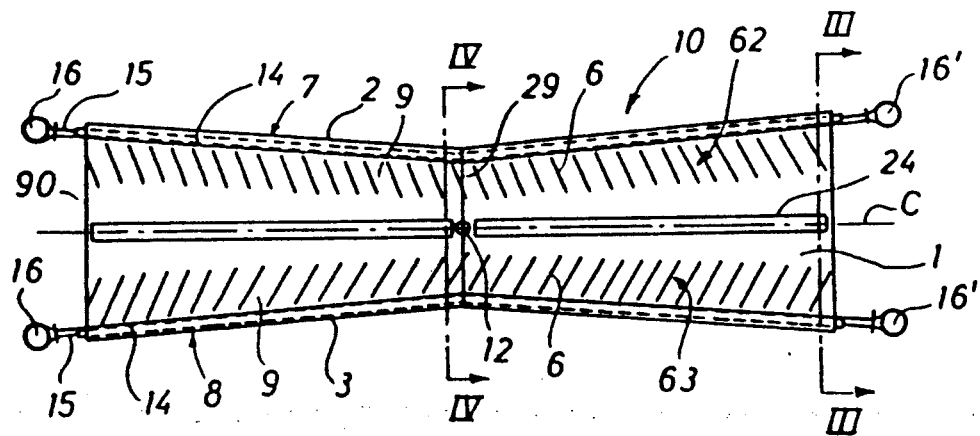
FIG. 7 is a planar view of a mounted, symmetrically shaped, two-sided inventive apparatus intended for growing of several plants.
Figure 8:
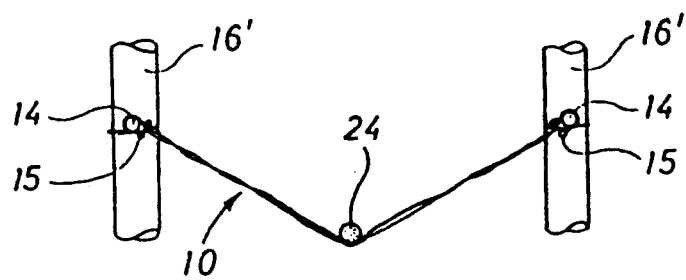
FIG. 8 is a sectional view through the apparatus of FIG. 7 along the line III—III.
Figure 9:
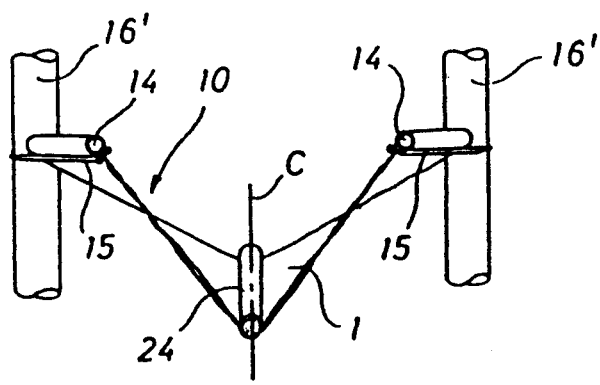
FIG. 9 is a sectional view through the apparatus of FIG. 7 along the line IV—IV.

In FIG. 6 the embodiment of the growing device 10 of FIG. 1 is shown with supporting means in form of a supporting string 47 wound helically around the growing device 10 and fastened at anchoring means, such as anchoring hooks 48 secured in anchoring blocks 49 in the ground 50. Preferably said strings are made of elastic material. Instead of anchoring blocks 49 a single suspension wire or rod 45 at the bottom of the device can be used.

Furthermore, instead of the clamps 46 of FIG. 5, one end of plastic straps (not shown) can be inserted through the layers 4, 5 and tied to the suspension wire or rod 45 at the bottom of the device, the opposite ends of said straps being provided with enlarged end pieces having shoulders acting as holder. Throughcuts with strengthened edges and for the insertion of said plastic straps are provided in the collapsed tubing simultaneous with the forming of the sealing lines 6, for instance by heat-sealing the two layers of plastic 4, 5 to each other in said areas.

FIGS. 7—10 illustrate another preferred embodiment of the invention, in which the growing device 10 comprising a collapsed tubing 1 is provided with two parallel rows 62, 63 of transverse sealing lines 6 symmetrically placed proportional to the center line C and with two longitudinal, outer, free passageways 7, 8 at the opposing edges 2, 3 of the tubing 1. Supply pipes 14 for nutrient solution are inserted in said passageways 7, 8. A free longitudinal central passageway 90 is provided between the two rows 63 of transverse sealing lines 6. Transverse passageways 9 between neighbouring transverse sealing lines 6 in a row 62, 63 are open to the respective longitudinal, outer passageway 7, 8 and to the longitudinal central passageway 90, thus forming passages therebetween for the nutrient solution and for the roots of the plants 18. At least one throughcut 12 is provided in the central passageway acting as an outlet 12 for excess nutrient solution.

When mounted, each of said edges 2, 3 having longitudinal, outer passageways 7, 8 with supply pipes 14 inserted therein are nested on suspended, opposing wires 15 each stretched between two posts 16, 16' in the same level, cf. FIG. 4. The interjacent part of the growing device 10 is hanging between and below said wires 15. Midways between the posts 16, 16' a strap 29 surrounding the opposing wires 15 is tightened thus drawing said wires towards each other. As a result the bottom of the central part of the growing device 10 has a lower position than at the ends of said growing device causing a downward inclination of the central passageway towards the outlet 12, cf. the sectional views along the lines III—III and IV—IV of FIG. 7. Moreover, the weight of the suspension means 15 and of the growing device 10 with supply pipes 14, plants 18 and nutrient solution weighs down the entire growing device 10 in a curve between the posts 16, 16' thus intensifying said inclination. When the growing device 10 is mounted outdoors a weighting member 24 in form of at least one sandhose may be placed on the growing device 10 above the central passageway 90, thereby assisting the growing device 10 to resist wind action.

The use of this embodiment of the growing device 10 is disclosed in connection with the growing device 10 of FIGS. 1–6, except that in this case two supply pipes 14 and two series of transverse passageways 9 are provided for each growing device 10. Due to the transverse inclination of the growing device towards the central passageway 90 this embodiment is suitable for growing several plants in each transverse passageway 9 thereby obtaining an intensive utilization of the area of the growing device.

Figure 10:
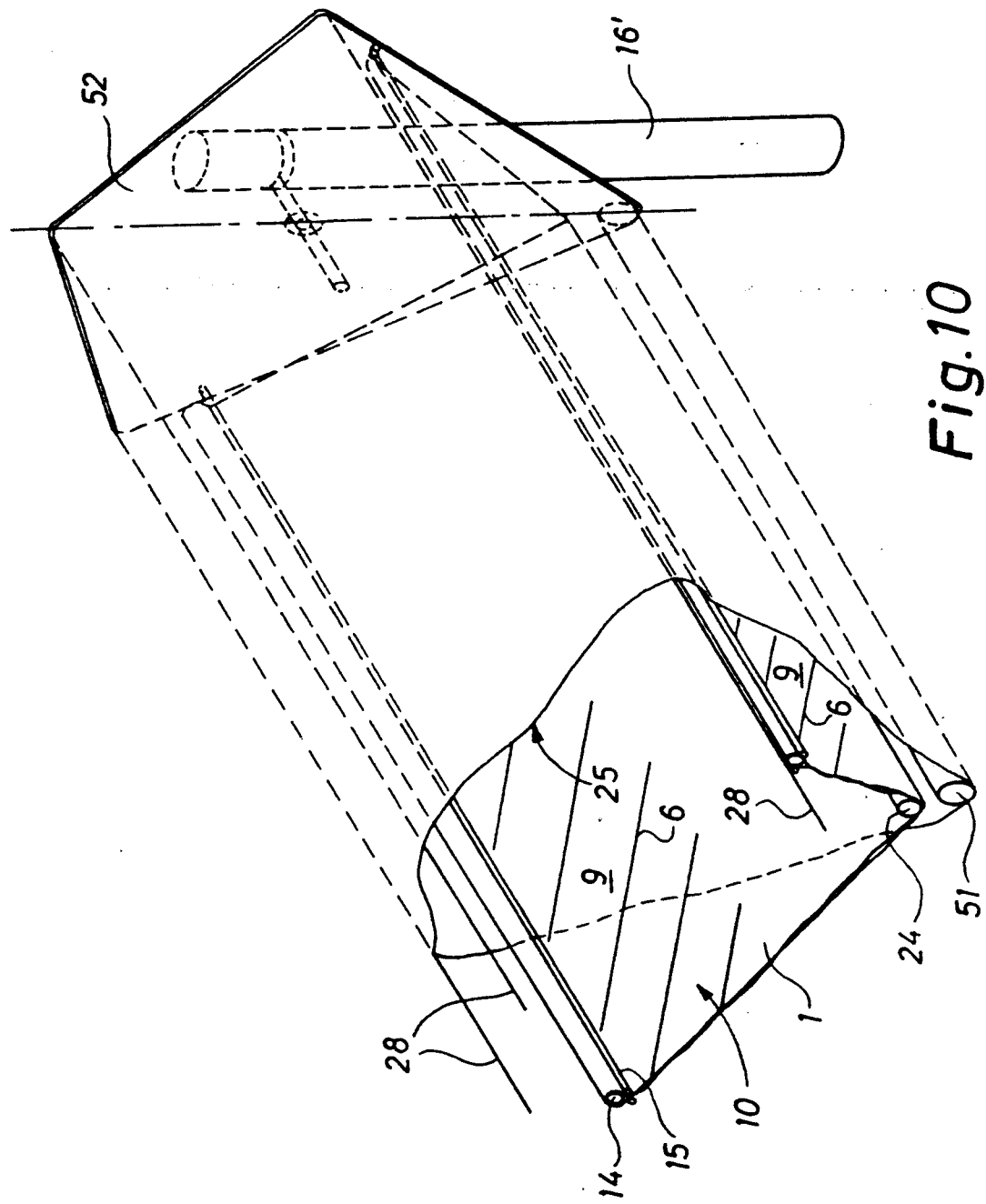
FIG. 10 is a diagrammatic perspective view of a part of the apparatus of FIG. 7 including an outer plastic tubing.

The embodiment illustrated in FIG. 10 is further provided with an outer plastic tubing 25 surrounding the suspended growing device 10, said plastic tubing being supported by an intermediate carrying means 28 in form of three parallel wires suspended triangularly and roof-shaped above the growing device 10 between two end frames 52 each clamped on a post 16, 16'.

In this case also the wires 15 are suspended between said two end frames 52. An outer plastic tubing 25 rests on above three parallel wires and is weighed down by a weighting member 51 inserted inside the bottom of the tubing 25. Instead of the three parallel wires the carrying means 28 can also be made of spirally wound steel strings or another type of upwards curved frames resting on top of the growing device 10 or mounted in end frames 52. At the ends of the growing device 10 the outer plastic tubing 25 can be closed outside of the end frames 52, thereby ensuring the maintenance of elevated temperatures and relative humidity inside the tubing.

Figure 11:
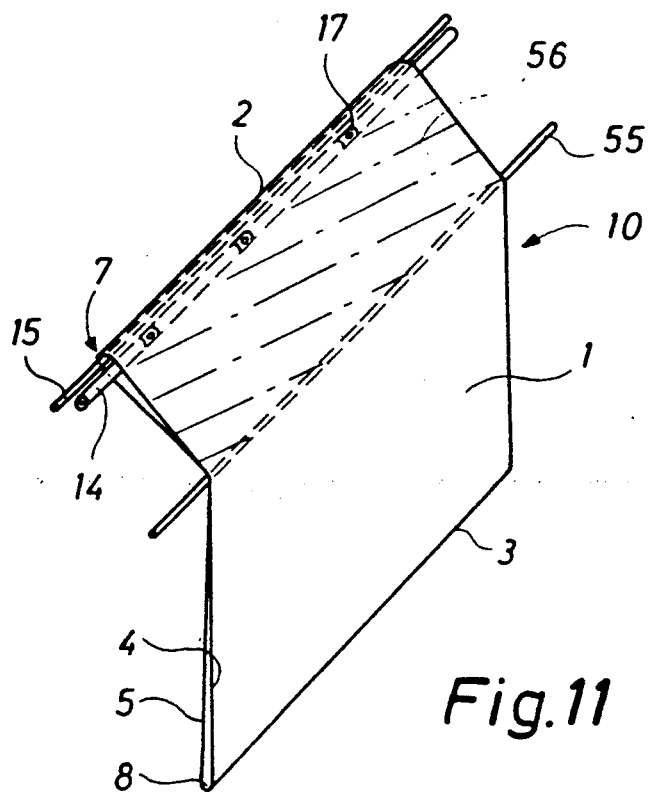
FIG. 11 is a diagrammatic perspective view of a further alternative embodiment of the inventive apparatus intended for growing of several plants in a simplified form without any sealings and with a single suspension means inside the apparatus and with a displacement means, FIG. 12a, b, c, d are sections of further alternative embodiments showing examples of sealing zones having various geometric forms.

FIG. 11 illustrates a further simplified embodiment of the inventive growing device 10. This growing device 10 comprises a collapsed plastic tubing 1 having a first upper, closed longitudinal edge 2 and a second lower, closed longitudinal edge 3 opposing each other, the opposing intermediate two layers 4, 5 of the collapsed tubing 1 being without any sealing therein. Said growing device 10 is shown suspended on a single wire 15 inserted therein alongside the supply pipe 14 inside the upper longitudinal passageway 7, and the upper part of said growing device 10 is placed in a sloping way by means of a displacement means 55 in the form of a wire suspended parallel with, below and sideways displaced from the suspension wire 15. Optionally, said layers 4, 5 could be provided with pleatings 56 extending parallel with, inclined to or perpendicular to the direction of length for the growing device 10. The effect of said pleatings 56 is that the nutrient solution on meeting such a pleating 56 will tend to follow said pleating, thereby guiding the water to the roots. Of course, it would also be possible to use this embodiment of the growing device 10 suspended on wires 15 inserted in each of the longitudinal passageways 7, 8 together with two supply pipes, as disclosed in connection with FIGS. 7-10, however, in this connection without using any displacement means 55.

Figures 12A, 12B, 12C, 12D:
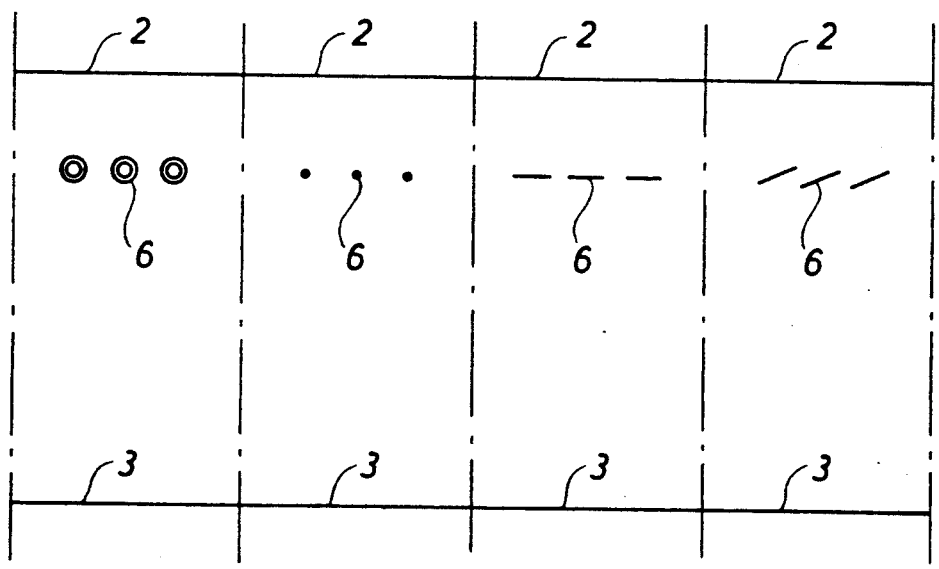

In FIGS. 12a, b, c, d is illustrated various geometric forms of sealing zones 6 applicable in connection with the invention in addition to the previously mentioned forms. The advantage of said forms of sealing zones 6 is that depending on the composition and thickness of the material of the layers 4, 5 the way of suspension of the growing device 10 and the kind of plants grown therein various forms of sealing zones are desirable. In FIG. 12a the sealings are ring-formed, in FIG. 12b in the form of spot weldings, and in FIGS. 12c and d in the form of short sealing lines of a length of between 5 and 15 cm and extending parallel with, inclined to or perpendicular to the direction of length of the growing device 10.

In FIGS. 13, 14 and 15 further simplified embodiments somewhat like those disclosed in FIGS. 1–6 and 11 of the inventive growing device 10 are disclosed, but all of them suspended on a single cord or wire 15 being inserted in an upper longitudinal passageway 7 as in FIG. 11, and suspended in strings 23, and with the supply pipe placed outside of the growing device 10 (not shown), with small supply tubes 44 leading therefrom to the inner of the growing device 10 at each plant.

In FIG. 13 a flattened tubing 1 is used having transverse sealings 6 extending perpendicular to the longitudinal direction of the said tubing, said sealings 6 forming transverse passageways 9, each for the growing of a plant, and extending between opposite closed longitudinal passageways 7, 8 along the closed longitudinal edges 2, 3 of the growing device 10. Minor throughcuts 11 through at least one of the flatwise juxtaposed layers 4, 5 of the tubing 1 are provided at the upper end of each transverse passageway 9 for the insertion of the plants and of the supply tubes 44. A number of longitudinally extending sharp grooves or pleatings 56 are provided in at least one of said layers 4, 5 below said throughcuts 11, for guiding of the nutrient solution added along said pleatings to the area of the inserted roots. Excess nutrient solution is discharged through outlets 12 via the lower longitudinal passageway 8.

In FIG. 14 a growing device is disclosed in which the lower edge 3 thereof is open, so that excess nutrient solution is discharged direct from each transverse passageway 9 to the soil or in a gutter. The sealing lines 6 have an inclined curved form in order to permit for the existance of longer roots, and instead of the grooves or pleatings 56 use is made of a number of stickings 43, such as detachable spot-weldings, for the performing of capillary forces in the areas of the roots of the inserted plants.

In FIG. 5 is disclosed an embodiment using a plastic tubing having inclined sealing lines 6 as in FIGS. 1 and 6, giving room for very long roots. In this embodiment the means for guiding of the nutrient solution to the area of the plant roots is made up of a narrow, thin strip of water-distributing material 42, inserted into the tubing 1 near the upper edge 2 thereof before provision of the sealing lines 6 or inserted into the tubing 1 together with the cord or wire 15 and fastened thereto.

FIGS. 16–19 illustrate apparatuses for growing of one plant only and a system therefor.

Figure 16:
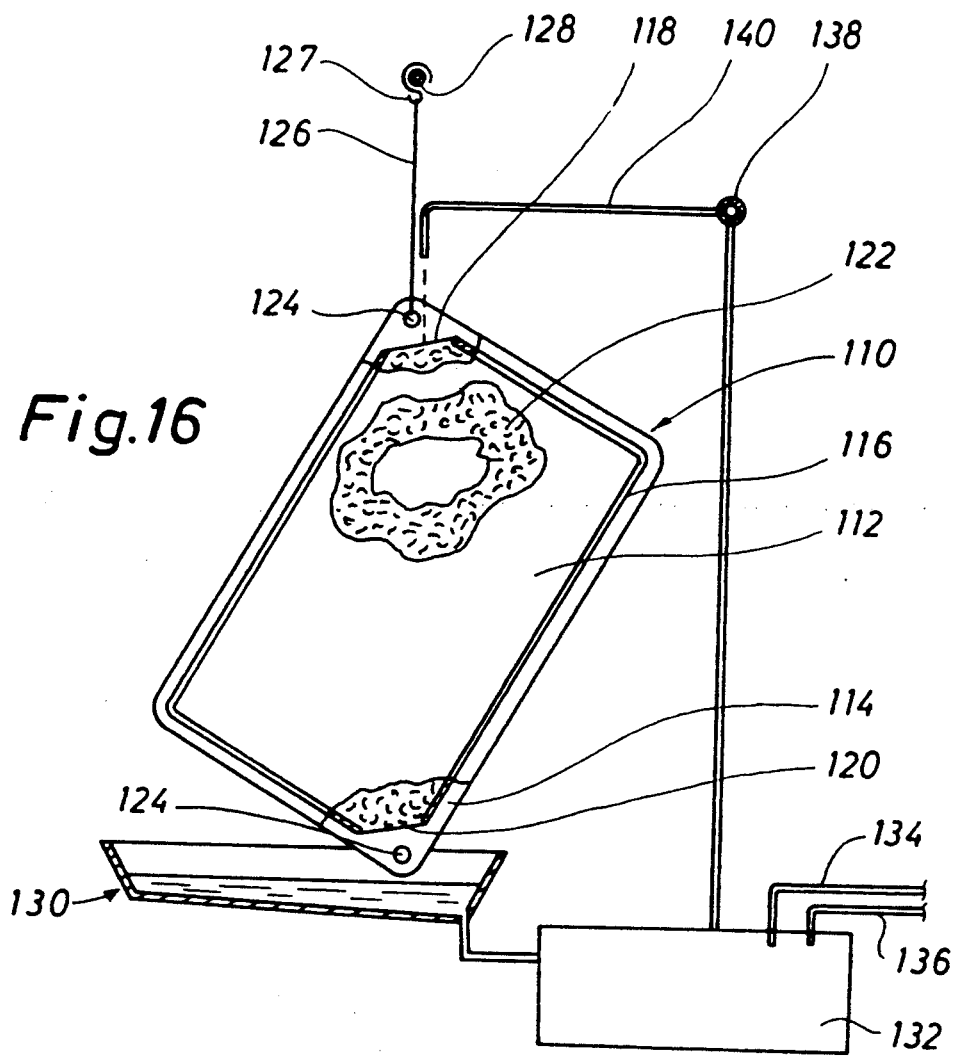
FIG. 16 is a front elevation view of an embodiment of the present invention including an apparatus intended for growing of one plant only and partially cut away.
Figure 17:
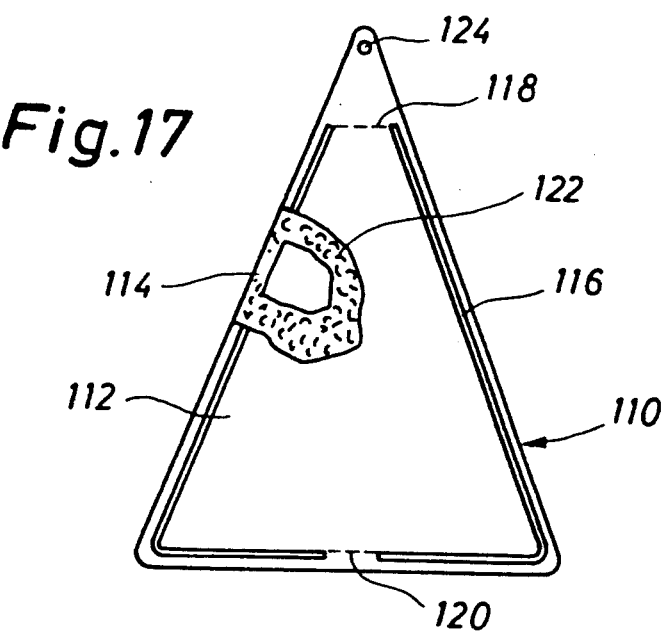
FIG. 17 is a front elevation of another embodiment of the apparatus of the invention, intended for growing of one plant only.

In FIG. 16 is shown an embodiment of the plant growing system using an apparatus of the invention, intended for growing of one plant only and partially cut away. It comprises a growing bag generally designated by the reference numeral 110, being suspended by a string 126 fastened at its top end to a horizontal steel wire 128 and further comprises a system 130–140 for continuous supply, control, and recirculation of nutrient solution through said growing bag 110. In FIG. 17 is shown another embodiment of the growing bag 110.

In FIG. 16 the growing bag 110 consists of two congruous rectangular layers of plastic sheet 112, 114 joined along the circumference, for instance by a welded edge or rim 116, thereby forming a rectangular growing bag with a closed interspace between the two layers of plastic sheets 112, 114, said layers being impenetrable to water, aquous vapor, and light except from two openings 118, 120 in said welded rim positioned at diagonal opposite corners of the growing bag 110, said opening at the top of the growing bag 110 being intended for the insertion of a plantlet into the growing bag 110 with the stem extending through the opening 118 and for a continuous supply of nutrient solution to said plant, and said opening 120 at the bottom of the growing bag 110 being intended for the outlet of percolated excess nutrient solution.

In between said two layers of plastic sheet 112, 114 could be closed a thin sheet of porous water-distributing material 122 consisting of hydrophobic material without any soil therein, preferably a non-woven fabric containing hydrophobic fibers in the form of the so-called Plant-Fibertex ®. Said sheet of water-distributing material 122 is cut to the shape of the closed interspace inside the growing bag 110.

Further, in the growing bag 110 close to the opening 118 a transverse opening 124 is shaped for the mounting of a string 126 for suspension of the growing bag 110 and for supporting and binding up the top of the plant. The other end of the string 126 is fastened to a horizontal steel wire 128 in a slidable and removable way, for instance by the use of a hook 127, slidable along said steel wire 128. A corresponding transverse opening 124 could be shaped close to the other opening 120 as well, so that the growing bag could be used optionally with the opening 118 or 120 at the top.

In FIG. 16 of the drawing the growing bag 110 is shown as being of a rectangular form, however, this is to be taken as an example of a preferred embodiment only, as the growing bag according to the invention could take up other forms too, as for instance triangular forms as in FIG. 17, trapezoidal or other polygonal forms, or it could be grounded by closed curves, preferably ovals, and/or it could have cut-off or rounded corners. Further, the transverse opening for the suspension could be positioned in the area of the growing bag including the sheet of the water-distributing material. The top opening 118 could be otherwise positioned and provided with a channel-formed welded holding means for holding of a supply tube 140 within the growing bag, and/or the lower opening 120 could be shaped as several openings or as a multiplicity of perforations in the bottom area of the growing bag. Additionally, in the bottom of the growing bag a bellows-like fold could be provided, the inner layer of which could be provided with the perforations.

The system for supply and recirculation of the nutrient solution comprises a gutter 130 situated below the opening 120 at the bottom of the growing bag 110 which is intended for collecting of percolated excess nutrient solution from a row of growing bags 110 and for leading it to a collecting tank 132; said gutter could also be comprised by a plastic hose being suspended by two internal strings in the longitudinal direction of the said plastic hose, said strings being tightly suspended close to each other on either side of the growing bags, above the bottom end of the growing bag. The said tank 132 is provided with means (not shown) for controlling of the content of nutrients and water, and means 134, 136 for the supply of additional nutrients and water, respectively. Further, the system comprises means for leading the nutrient solution, as supplemented, from the collecting tank 132 to supply pipes 138 located above the growing bags 110, and supply tubes 140 extending therefrom to the individual growing bags 110. The end of the supply tubes 140 may be inserted into the top opening 118 or may be situated above said opening.

Figure 18:
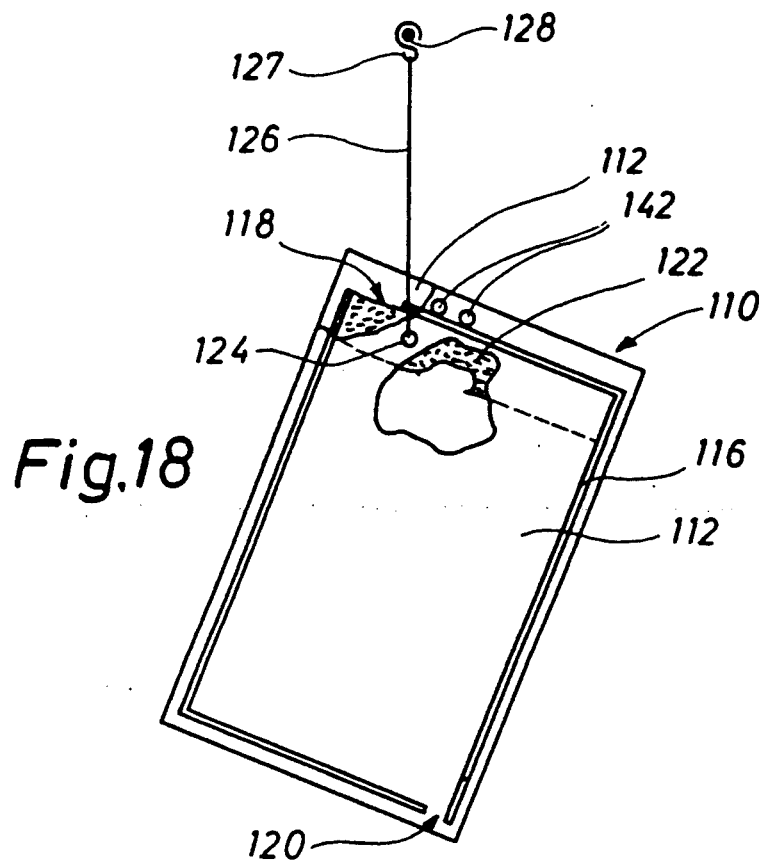
FIG. 18 is a front elevation view of a preferred embodiment of the apparatus of the invention, intended for growing of one plant only.
Figure 19:
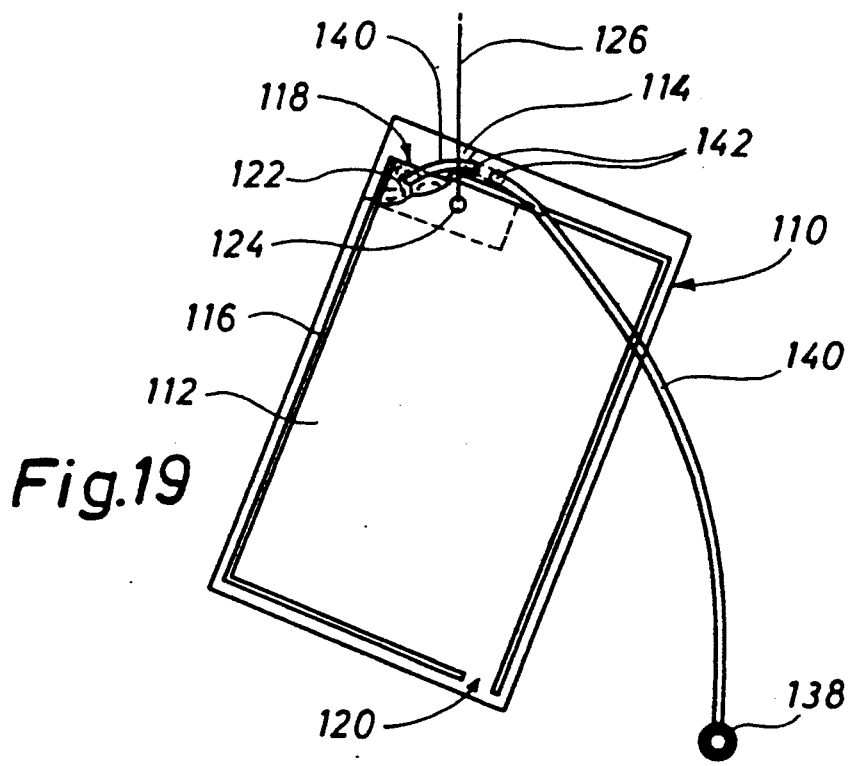
FIG. 19 is a front elevation view of yet another preferred embodiment of the apparatus of the invention, intended for growing of one plant only.

In FIGS. 18 and 19 are shown preferred embodiments of the growing bag 110 intended for the growing of one plant only, and in which is used the same reference numerals referring to the same features as in FIGS. 16 and 17. As compared to the embodiment disclosed in FIG. 16, the main differences are that the size of the water-distributing material 122 is much smaller, and that the transverse opening 124 is located in the area of the water-distributing material 122, said material thereby also imparting strength to the growing bag in the area of mounting of the string 126. Further, in FIGS. 18 and 19, the supply pipe 138 is located below the growing bag, and the free end of the supply tube 140 is inserted into the growing bag through the top opening 118 and is maintained at its correct position in the growing bag by being inserted through two apertures 142 in the growing bag near the top opening 118 for the insertion of the plant stem. These embodiments have shown magnificent effects in growing plants. In the initial growing period the effect of the water-distributing material 122 is that it is supporting and maintaining the plant in the bag, that it is guiding the water to the roots of the plant, and that it is imparting strength to the growing bag. In the long run, however, the roots of the plant themselves take over the effect of supporting the plant and guiding of the water, so that the only additional effect of the material 122 then seems to be that of strengthening the bag.

When using the plant growing system, the growing bag 110 is mounted as shown in FIG. 16, and the nutrient solution is circulated through the growing bag 110 by drip watering from the supply tubes 140 through the top opening 118 until the water-distributing material 122 is completely wetted, and percolated excess nutrient solution is flowing down through the opening 120 into the gutter 130. Then a plantlet is inserted into the growing bag 110 through the top opening 118 with its stem and top extending through and above said opening, whereupon a continuous supply of nutrient solution, supplemented with the necessary amounts of nutrient and water, is recirculated to the water-distributing material 122 in the growing bag as long as the growth of the plant is to be continued. By an initial placing of the growing bags close to each other and a regular moving of the growing bags during the growing period, which is very easily conducted, a maximum utilization of the growth volume available may be obtained by a minimum expenditure of labor.

I claim:

1. A method of growing plants, said method comprising the steps of:
    using an apparatus comprising a pair of flatwise juxtaposed layers of watertight material, such as plastic film, defining at least one flat interspace for the development of the roots of a plant, said apparatus having a first end and an opposite second end, at least the first end being closed, and said apparatus further being without any growth substrate therein, and said interspace being substantially closed to the surrounding atmosphere at least around the top of the root apart from minor openings for the plant stem and for the exchange of nutrient solution,
    suspending said apparatus on at least one suspension means with said first end fixed at said suspension means in a substantially horizontal plane, with the rest of the apparatus suspended therefrom, and with the plane of the interspace vertically or slopingly oriented,
    forming at least one minor throughcut in at least one of said layers,
    forming at least one drain opening at a lower part of said interspace,
    inserting plant roots without any growth substrate inside said interspace at the upper part thereof, with the stem of the plant extending through said minor throughcut,
    adding nutrient solution to said interspace at a location above said roots of the plant and guiding it to said roots,
    quickly percolating said nutrient solution down the roots, and
    allowing unabsorbed nutrient solution to drain out from below the roots through said drain opening.

2. A method according to claim 1, wherein said unabsorbed nutrient solution is collected below said apparatus and recirculated.

3. A method according to claim 1, wherein an amount of at least 0.1 l/h of nutrient solution, preferably at least 0.25 l/h, is added to each plant.

4. A method according to claim 1, wherein a further suspension means is used for suspension of the apparatus with at least a part of the interspace or interspaces slopingly oriented.

5. A method according to claim 1, wherein the apparatus is formed as a flattened plastic tubing having two opposite closed longitudinal edges and is used as a growing device for a number of plants, said tubing being suspended along a first one of the two opposite closed longitudinal edges thereof, and said drain opening is at the lowest point of the second closed longitudinal edge.

6. A method according to claim 1, wherein the apparatus is formed as a flattened plastic tubing having two opposite closed longitudinal edges and is used as a growing device for a number of plants, said tubing being suspended along each of the two opposite closed longitudinal edges thereof on substantially parallel, horizontal extended suspension means, an intermediate part of the growing device sagging therebetween, thereby forming interspaces each sloping from a closed edge towards a middle area of the device, plant roots being inserted into interspaces on either side of the middle area and nutrient solution being added near each suspended edge and percolating towards the middle area of the tubing, and excess nutrient solution draining out through a drain opening formed at the lowest point of said middle area of the tubing.

7. An apparatus for growing plants, said apparatus comprising:
    a pair of flatwise juxtaposed layers of watertight material, such as plastic film, defining at least one flat interspace for the development of the roots of a plant and forming a drain opening,
    said interspace being substantially closed to the surrounding atmosphere, at least at the top of the roots, apart from minor openings for the insertion of the plant roots and the plant stem and for the addition and drainage of nutrient solution,
    said apparatus having a first end and a second opposite ends, at least the first end being closed,
    said apparatus further having means for guiding the added nutrient solution to the area of the inserted roots, said means for guiding being devoid of a growth substrate, and means for suspending the apparatus so that the nutrient solution added is allowed to quickly percolate the roots and drain out through the drain opening.

8. An apparatus according to claim 7, intended for the growing of a single plant and having the form of a flattened growing bag defining a single interspace being closed all around its circumference apart from a minor opening at its first end for the insertion of a plant and the addition of nutrient solution, said drain opening being at its opposite second end, said growing bag having incorporated therein, as a means for guiding the nutrient solution, a thin coherent porous layer of water-distributing material selected from the group consisting of paper, glass wool, rock wool, foamed plastic, woven fiber-containing textile material, and non-woven fiber-containing textile material; and said growing bag further having means for suspending the growing bag so that the nutrient solution added to the interspace of the growing bag through the opening at the first end passes over said water-distributing material and the plant roots and drains out through the drain opening at the second end.

9. An apparatus according to claim 8, wherein said thin coherent porous layer of water-distributing material is sized to fit the area of the interspace defined in said bag.

10. An apparatus according to claim 8, wherein said thin coherent porous layer of water-distributing material fills only a minor part of the bag near the first end of the bag around the opening for the plant stem and for the addition of nutrient solution.

11. An apparatus according to claim 8, wherein said suspension means includes an aperture in the two plastic layers near said first end of the growing bag.

12. An apparatus according to claim 7, for growing a number of plants, said apparatus comprising:

a windable length of a pair of flatwise juxtaposed layers of watertight material, each of said two layers having first and second longitudinal edges, the two layers being interconnected and sealed at least along said first longitudinal edges thereof and being adapted for suspension on a substantially horizontally extending suspension means near said first interconnected and sealed edges, thereby forming a growing device closed at the top, at least one of said two layers having minor through-cuts spaced along the length thereof on a line parallel with and near said first edge, for the insertion of plant roots.

13. An apparatus according to claim 12, said apparatus comprising:

a windable length of a flattened tubing of plastic film having opposed first and second closed longitudinal edges, said tubing being adapted for suspension on a suspension means near said first closed longitudinal edge thereof, said tubing further being adapted for the insertion of a drip irrigation pipe inside said tubing alongside said first closed edge, said plastic tubing further being adapted for the insertion of plant roots through minor spaced through-cuts through at least one of the two juxtaposed layers of said tubing, near said first closed longitudinal edge, and said plastic tubing being provided with a discharge opening for percolated nutrient solution at the lowest point of said second closed longitudinal edge.

14. A system using a plurality of apparatuses as claimed in claim 13, further comprising:

a supply pipe in the form of drip irrigation pipe having spaced outlets inserted in the longitudinal passageway of each apparatus near the first closed longitudinal edge thereof, said first edge of the apparatus and said drip irrigation pipe being suspended on at least one suspension member, such as a cord or wire, stretched between at least two posts, the remaining part of the apparatus depending therefrom, the suspension means further including gripping means gripping the suspension member and the upper part of the apparatus holding the drip irrigation pipe at suitable places along the length thereof, thereby fastening the apparatus to the suspension member, and at least one gutter for collecting and passing on used, excess nutrient from the plants to the collecting tank, said suspension member being position at a level sufficient for keeping the bottom of the apparatus just above the top of the gutter.

15. A system according to claim 14, wherein each apparatus is suspended on a suspension member in the form of a cord or wire being inserted in the longitudinal passageway of the apparatus, the supply pipe being placed outside said apparatus and having small irrigation pipes extending therefrom and;

each irrigation pipe has an outlet placed inside the interspace above the roots of an individual plant therein.

16. An apparatus according to claim 12, wherein said two layers of plastic are sealed in sealing-zones having a simple geometric form and spaced along the longitudinal direction of said layers and from the longitudinal edges thereof, said sealing zones thereby leaving longitudinally free passageways near said first and second edges and forming a series of successive passageways open to said two longitudinally extending passageways, said passageways being transverse with respect to said longitudinal edges and having a substantially flat cross-section.

17. An apparatus according to claim 16, said apparatus comprising:

a windable, flattened plastic tubing having two flatwise juxtaposed layers of plastic film, said layers being interconnected along opposing first and second closed longitudinal edges, respectively, of said flattened plastic tubing, said two flatwise juxtaposed layers of the flattened tubing being sealed along two parallel longitudinal rows of sealing-zones located on either side of a center line of said flattened tubing, each sealing-zone in a row extending between a first point located in spaced-apart relation to a closed edge of the flattened tubing, and a second point located farther away from said closed edge and in spaced-apart relation to the center line of the flattened tubing and on the same side thereof as said first point, said rows of sealing-zones thereby leaving free longitudinal passageways each extending along the length of a respective one of said closed edges and a free longitudinal, central passageway extending between said two parallel rows of sealing-zones, said two rows of sealing-zones further forming two series of successive, flat passageways separated from each other by the sealing-zones, and each flat passageways being transverse with respect to the longitudinal passageway and open to a corresponding longitudinal passageway and to the longitudinal, central passageway.

18. A system using a plurality of apparatuses as claimed in claim 17, further comprising
a drip irrigation pipe inserted in each of the outer longitudinal passageways of each apparatus,
each closed edge of each apparatus including the inserted irrigation pipe being suspended on at least one suspension member stretched between at least two posts.

19. A system according to claim 18, wherein a further suspension means is provided outside of each apparatus displaced downwards and sideways of the suspension member at the first closed edge of the apparatus, thereby slopingly orienting an upper part of said apparatus.

20. A system for growing of plants, using a number of apparatuses according to claim 7, said system comprising:
a collecting tank for nutrient solution,
a control means for continuously measuring and adjusting the content of nutrient salts and other additives necessary for the growth of plants by adding the necessary amounts of water, macrosubstances and microsubstances to the nutrient solution,
pumps and pipes for continuously carrying nutrient solution to the plants, and
at least one gutter for collecting and passing-on of used, excess nutrient solution from the plants to the collecting tank, said system further comprising:
a number of supply pipes corresponding to the number of apparatuses, and
suspension means for suspension of the apparatuses,
each of said apparatuses being adapted for the insertion therein of a supply pipe or the outlets thereof in the interspace near said suspension means.

* * * * *